US00RE34049E

United States Patent [19]

Taki et al.

[11] E Patent Number: Re. 34,049

[45] Reissued Date of Patent: Sep. 1, 1992

[54] ROD-LESS CYLINDER

[75] Inventors: Teluomi Taki, Kasugai; Shigehiro Toyoda, Hashima, both of Japan

[73] Assignee: CKD Corporation, Komaki, Japan

[21] Appl. No.: 699,089

[22] Filed: May 13, 1991

Related U.S. Patent Documents

Reissue of:

[64] Patent No.: 4,829,881
Issued: May 16, 1989
Appl. No.: 165,865
Filed: Mar. 9, 1988

[30] Foreign Application Priority Data

Mar. 12, 1987 [JP] Japan ..... 62-57454
Jan. 6, 1988 [JP] Japan ..... 63-450[U]

[51] Int. Cl.[5] ..... F01B 29/00
[52] U.S. Cl. ..... 92/88; 277/DIG. 7
[58] Field of Search ..... 92/88; 244/63; 277/DIG. 7

[56] References Cited

U.S. PATENT DOCUMENTS 2,983,256 5/1961 Seeloff ..... 121/38
3,221,610 12/1965 King et al. ..... 92/24
4,373,427 2/1983 Garlapaty et al. ..... 92/88
4,545,290 10/1985 Lieberman ..... 92/88
4,555,980 12/1985 Hoeglund ..... 92/88
4,664,020 5/1987 Kaiser ..... 92/88
4,733,604 3/1988 Lipinski ..... 92/88

FOREIGN PATENT DOCUMENTS 2431706 1/1976 Fed. Rep. of Germany .
2519251 11/1976 Fed. Rep. of Germany .
3120157 12/1982 Fed. Rep. of Germany .
236370 8/1984 Fed. Rep. of Germany ..... 92/88

*Primary Examiner*—Thomas E. Denion
*Attorney, Agent, or Firm*—Jordan and Hamburg

[57] ABSTRACT

A rod-less cylinder comprises a cylinder having an inner surface, an outer surface, a slit elongating in the longitudinal direction in the outer surface, and being formed by a pair of opposing side surfaces, a side recess on the inner surface, which has a width larger than that of the slit, which extends over two sides of the slit and in the direction of the width of the same, and which have first surfaces intersection the side surfaces of the slit and second surfaces intersecting the first surfaces. The rod-less cylinder further comprises a piston which is able to reciprocate in the cylinder and a sealing member which is detachably fitted in the side recess, and which is able to close the slit. The sealing member has a pair of holding ribs for holding the sealing member in the side recess by its engagement with the second surfaces, and a pair of sealing lips for closing the cylinder and the side groove.

6 Claims, 3 Drawing Sheets

ROD-LESS CYLINDER

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a fluid pressure cylinder, and more particularly to a rod-less cylinder of a slit type.

2. Description of the Related Art

In recent years, rod-less cylinders have been used which do not need any piston rods as an alternative to cylinders of the rod type in order to save a space. A cylinder of the type described above comprises, as shown in FIG. 7, an elastic sealing member 103 for sealing a slit 102 formed in the axial direction of a cylinder 101, and an outer cover 104, whereby the movement of a piston 106 is conducted to a mounting body 107 through a connecting member 105 projecting outwardly through the slit 102.

In a cylinder of the type described above, in order to prevent the sealing member 103 from becoming separated from the slit 102 even if no internal pressure exists in the cylinder 101, means for retaining the sealing member 103 in the slit 102 is required. Furthermore, in order to avoid the internal pressure in the cylinder 101 affecting the sealing member 103, the width of the slit 102 is preferably reduced.

As a means for retaining such a sealing member in the slit, a structure is disclosed in U.S. Pat. No. 4,664,020 in which they are connected by way of inserting a projecting disposed in the upper surface of the sealing member into a space between a pair of leg members projecting downwardly from the outer cover.

However, in a cylinder of the type described above, the connected portion of the leg members of the outer cover with the projection of the sealing member needs to be accommodated in the slit, and the width of the slit therefore needs to be rather large. As a result of this, a large sealing member is needed for the purpose of bearing the internal pressure of the cylinder. This leads to the problem that the size of the cylinder cannot be reduced.

Furthermore, since the sealing member is hung from the leg portion of the outer cover for the purpose of support, it can easily slip off in the direction of the width of the slit in this slit, causing the sealing lip thereof to be separated from the inner surface of the cylinder.

A rod-less cylinder is also disclosed in U.S. Pat. No. 4,545,290 which comprises a sealing member constituted by a retaining member secured in a slot and a sealing portion for sealing the inner surface of the cylinder.

However, when the sealing member described above is subjected to the internal pressure of the cylinder, the sealing member is raised in the outward direction of the cylinder, causing the sealed portion to be bent in the direction of the inside of the cylinder relative to the two inner ends of the slot to act as a fulcrum. If the sealed portion is bent, air in the cylinder can leak through the sealed portion between the sealing lip surface and the inner surface of the cylinder. As a result of this, the airtightness of the cylinder cannot be maintained, and the efficiency with which the piston is driven thus deteriorates.

Furthermore, in the disclosed U.S. Pat. No. 4,545,290, since the inner surface of the cylinder is formed with an annular shape, the curvature of the sealing lip surface of the sealed portion should conform to that of the inner surface of the cylinder. Therefore, the work involved in manufacturing the sealing member becomes complicated. Furthermore, since the inner surface of the cylinder is formed in a curved surface while the top surface of the piston has a flat surface, a gap is created between the inner surface of the cylinder and the top surface of the piston at the two ends of the sealing lip. Consequently, a problem of air leakage at this gap arises.

SUMMARY OF THE INVENTION

A major object of the present invention is to provide a rod-less cylinder exhibiting compactness, stability and durability without involving any necessity to increase the width of the associated slit.

Another object of the present invention is to provide a rod-less cylinder wherein the piston can be efficiently operated without any occurrence of air leakage and the sealing member can be stably maintained in a side groove.

In order to achieve the above-described object, a rod-less cylinder according to the present invention comprises: a cylinder having an inner surface, an outer surface, a slit disposed at the outer surface elongated in the longitudinal direction of the cylinder, the slit being defined by a pair of opposing side surfaces, and a side recess formed at the inner surface and having a width larger than that of the slit so as to extend beyond both the side surfaces of the slit in the widthwise direction thereof, the side recess extending along the length of the slit and having a pair of first surfaces intersecting the side surfaces of the slit and a pair of second surfaces intersecting the first surface; a piston capable of moving in the cylinder in a reciprocated manner; and a sealing member detachably fitted in the side recess such as to be capable of closing off the slit, the sealing member having a pair of holding ribs brought into engagement with the second surfaces for the purpose of holding the sealing member in the side recess, and a pair of sealing lips sealing the junctions between the inner surface of the cylinder and the side recess.

Other and further objects of this invention will become apparent upon an understanding of the illustrative embodiments about to be described or will be indicated in the appended claims, and various advantages not referred to herein will occur to one skilled in the art upon employment of the invention in practice.

DESCRIPTION OF THE PREFERRED EMBODIMENTS

Figure 1:
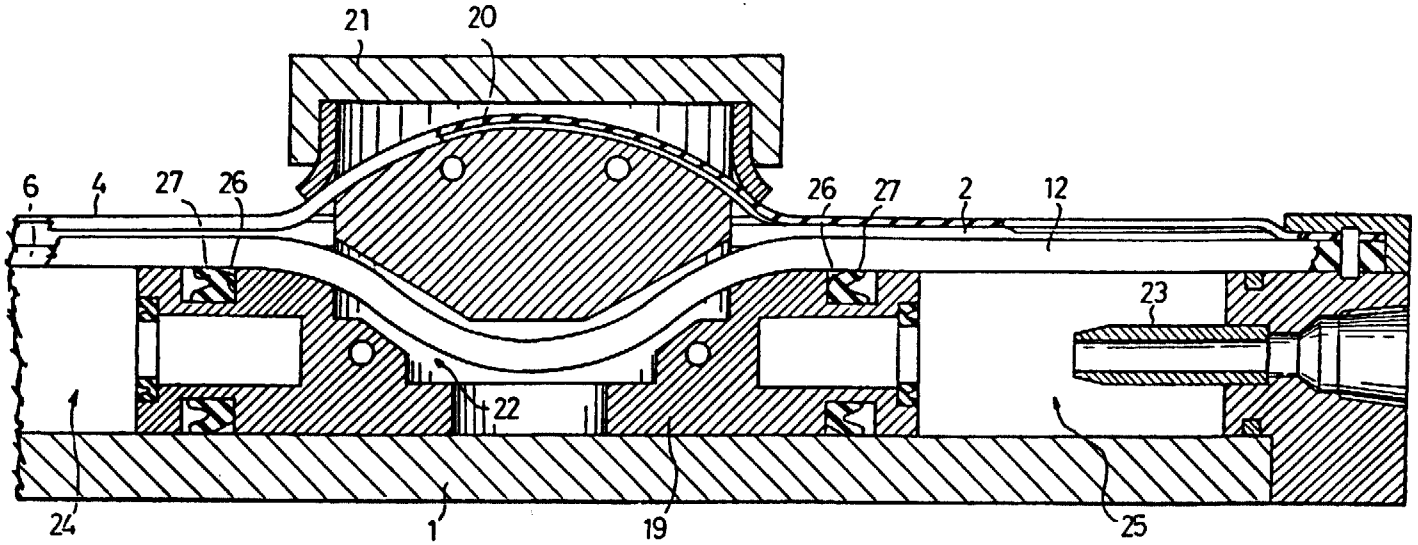
FIG. 1 a vertical cross-sectional view of a rod-less cylinder according to the present invention.
Figure 3:
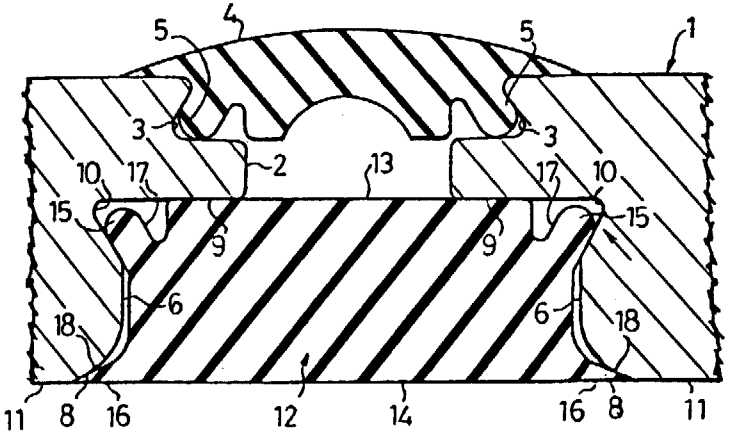
FIG. 3 is an enlarged partial cross-sectional view of FIG. 2 illustrating in detail the sealing member according to the first embodiment.
Figure 2:
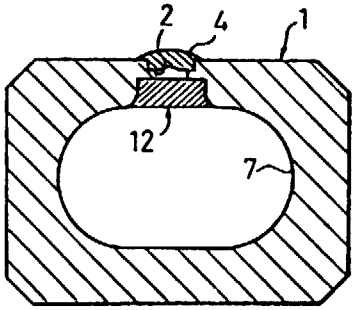
FIG. 2 is a cross-sectional view of a cylinder according to a first embodiment of the invention.

Referring to FIGS. 1 to 3, a first embodiment of the present invention will now be described.

A cylinder 1 having an inner bore having a slot-like cross sectional shape is provided with a slit 2 which is formed through the cylinder 1 in the direction of the thickness of the same and has a pair of opposing side surfaces disposed in the longitudinal direction of the cylinder 1. Fitting grooves 3 are provided at two sides of the slit 2 adjacent to the outer surface of the cylinder 1. A pair of fitting ribs 5 provided on two sides of the lower surface of an outer cover 4 which is made of an elastic material are fitted into the fitting grooves 3 so that the outer cover 4 is detachably held therein.

A side recess 6 with a width larger than that of the slit 2 is formed at the inner surface 7 of the cylinder 1 in such a manner that its two sides are disposed beyond both the side surface of the slit 2. The side recess 6 has a pair of inner surfaces 9 which are respectively disposed substantially perpendicular to the side surfaces of the slit 2. The side recess 6 also has a pair of side surfaces which are perpendicular to the inner surfaces 9. The junction between each of the side surfaces of the side recess 6 and the inner surface 7 of the cylinder 1 is a tapered-guide surface 8, and a groove 10 is formed near the junction between each of the inner surfaces 9 and the side surfaces of the side recess 6. The guide surfaces 8 and the groove 10 extend in the longitudinal direction of the side recess 6 along the full length of the same. The inner surfaces 7 of the cylinder 1 at both sides of the guide surfaces 8 are flat straight surfaces 11.

A sealing member 12 made of an elastic material, such as rubber or a synthetic material, is fitted in the side recess 6. When the sealing member 12 is fitted in the side recess 6, the two margins of the top surface 13 of the sealing member 12 abut the inner surfaces 9 of the side recess 6, and a bottom surface 14 is continuous with the straight surfaces 11 of the cylinder 1 to form a continuous flat surface. The sealing member 12 has a pair of holding ribs 15 which project outwardly at the two lateral edges of the top surface 13 thereof, and a pair of sealing lips 16 project outwardly at the two lateral edges at the bottom surface thereof. Between each holding rib 15 and each lateral edge of the top surface of the sealing member 12 is provided a relief groove 17, whereby the holding rib 15 is able to bend easily toward the relief groove 17. The sealing member 12 is held at a predetermined position in the side recess 6 by accommodating and fitting the holding ribs 15 in the corresponding grooves 10 of the side recess 6. That is, the two holding ribs 15 are fitted in the corresponding grooves 10 in a state wherein they are respectively slightly compressed in the direction toward the relief grooves 17. As a result of this, the two holding ribs 15 hold the sealing member 12 at a central position relative to the width of the side recess 6 abutting against the surface of the recess 10 by virtue of their elastic force. Simultaneously, each sealing surface 18 of the sealing member 12 is supported by a respective guide surface 8 in such a manner that the sealing surface 18 is fitted to the guide surface 8 in a close-contact manner. Consequently, the lower portion of the sealing member 12, that is the sealing lip 16, is prevented from slipping off in the widthwise direction of the side recess 6.

A connection member 20 projecting outwardly through the side recess 6, slit 2 and the fitting grooves 3 is fitted to a piston 19 which is accommodated in the cylinder 1. A table 21 is mounted on the top end of the connection member 20. A passage 22 is formed in the piston 19 for inserting the sealing member 12 thereinto. When air is supplied and discharged alternately by means of air nozzles 23 disposed at the two ends of the cylinder 1 to a front chamber 24 and a rear chamber 25, the piston 19 is reciprocated in the cylinder 1, whereby the table 21 is in turn reciprocated. In the passage 22 in the piston 19, when the piston 19 is reciprocated, the sealing member 12 is downwardly separated from the side recess 6, and the outer cover 4 is upwardly separated from the fitting groove 3. The sealing member 12 and the outer cover 4 return to their original positions in the side recess 6 and the fitting grooves 3 behind the piston 19 as it is being moved. Lip-like packing pieces 27 having flat surfaces which correspond to the straight surfaces 11 of the cylinder 1 and the bottom surface 14 of the sealing member 12 are fitted in annular grooves 26 disposed at the two ends of the piston 19. When the piston 19 is moved, the outer surface of the packing 27 slides along the inner surface 7 of the cylinder 1 and the bottom surface 14 of the sealing member 12, whereby the space between the piston 19 and the cylinder 1 is sealed. As a result of this, air leakage to the outside of the cylinder 1 through the side recess 6 or the slit 2 is prevented.

An operation of the above-described rod-less cylinder will now be described.

When the rod-less cylinder is not being operated, that is, when the bottom surface 14 of the sealing member 12 is subjected to no air pressure, the holding ribs 15 are elasticity fit in the grooves 10, respectively. As a result of this, the sealing member 12 is held at a predetermined position in the side recess 6.

When the rod-less cylinder is operated, that is, when air is supplied to the front cylinder 24 or the rear chamber 25 from the air nozzle 23, causing the bottom surface 14 of the sealing member 12 in the two chambers 24 and 25 to be subjected to air pressure, the whole body of the sealing member 12 is urged toward the inner surface 9 of the side recess 6. In this state, the two margins of the sealing member 12 abut the inner surfaces 9 of the side recess 6 so that its movement toward the slit 2 is restricted. Thus the sealing member 12 cannot be raised into the slit 2 because its abutment against the inner surfaces 9 of the side recess 6 is maintained. Consequently, the sealing member 12 is held in the side recess 6 at substantially the same position as that when the cylinder 1 is not being operated. Therefore, when the sealing member 12 is subjected to air pressure, warping of the sealing lips 16 is prevented which ensures that the latter do not project over the inner surface 7 of the cylinder 1. Consequently, the close-contact between the sealing surface 18 of the sealing member 12 and the guide surface 8 of the side recess 6 is maintained, whereby a continuous surface without any interception is formed over the inner surface 7 of the cylinder 1 and the bottom surface 14 of the sealing member 12. As a result of this, the outer surface of the packing 27 on the outer surface of the piston 19 seals the inner surface 7 of the cylinder 1 and the sealing member 12 without any gaps therebetween, whereby air leakage from the cylinder 1 is prevented. Furthermore, since the straight surfaces 11 of the cylinder 1 and the bottom surface 14 of the sealing member 12 are in the same plane, the flat-shaped packing 27 is positioned in close contact with the thus created flat plane. As a result of this, air leakage due to a gap created between the packing 27 and the inner surface 7 of the cylinder 1 can be prevented.

The sealing member 12 is at all times disposed at a central position within the side recess 6 due to the engagement of the holding ribs 15 and the grooves 10, and of the sealing surfaces 18 and the guide surfaces 8, regardless of the operation or non-operation of the rod-less cylinder. As a result of this, the sealing surfaces 18 are prevented from slipping off and separating from the guide surfaces 8, whereby air leakage through the sealing lip portion 16 is prevented even if the sealing surface 18 is subjected to air pressure.

Furthermore, since it is only necessary to make the sealing surfaces 18 of the sealing member 12 flat so as to be continuous to the guide surfaces 8, the sealing member 12 can be manufactured without involving any complicated process.

When the sealing member 12 is separated from or returned to the side recess 6 in correspondence with the movement of the piston 19, each holding rib 15 deforms toward the relief groove 17 and the separation and return can thus be performed smoothly. Furthermore, when the sealing member 12 returns into the side recess 6, it is guided by the guide surface 8 which facilitates its movement into the side recess 6.

Figure 4:
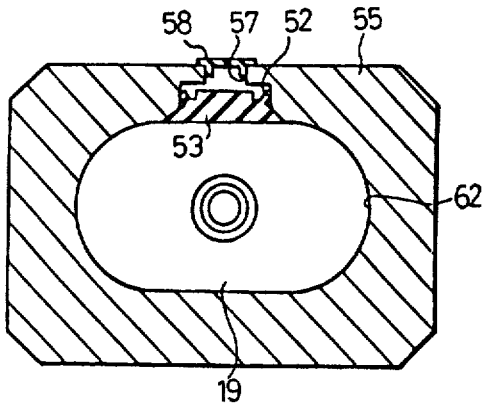
FIG. 4 is a cross-sectional view of a sealing member with a cylinder according to a second embodiment.
Figure 5:
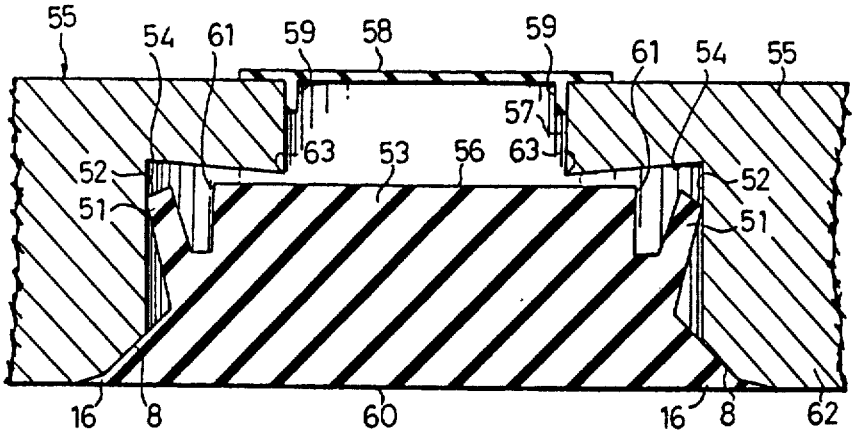
FIG. 5 is an enlarged cross-sectional view illustrating a state wherein the sealing member according to the second embodiment is not subjected to the internal pressure of the cylinder.

A second embodiment of the present invention will now be described with reference to FIGS. 4 to 6.

In this embodiment, the grooves for holding the holding ribs 51 are omitted. Therefore, the holding ribs 51 are brought into engagement with the side surfaces of the side recess 52 due to its own elastic force for the purpose of holding the sealing member 53 at a predetermined position in the side recess 52. The inner surfaces 54 of the side recess 52 are arranged to be more slanted toward the outer surface of the cylinder 55 as they extend away from the side surfaces of the slit 57. On the other hand, the top surface 56 of the sealing member 53 is arranged to be parallel with the widewise direction of the slit 57. When the sealing member 53 is subjected to no air pressure, it is held, as shown in FIG. 5, in the side recess 52 in such a manner that a slight gap remains between the top surface 56 of the sealing member 53 and the inner surface 54 of the side recess 52. The outer cover 58 has a flat shape having a pair of hanging portions 59 which are arranged to be fitted in the slit 57. The other portions are constituted in the same manner as that of the first embodiment. Therefore, the description for them is omitted.

Figure 6:
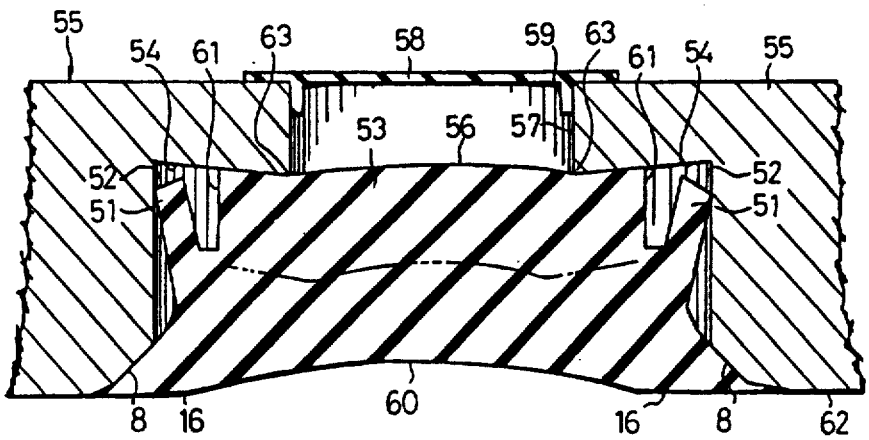
FIG. 6 is an enlarged cross-sectional view illustrating a state wherein the sealing member is subjected to the internal pressure of the cylinder.
Figure 7:
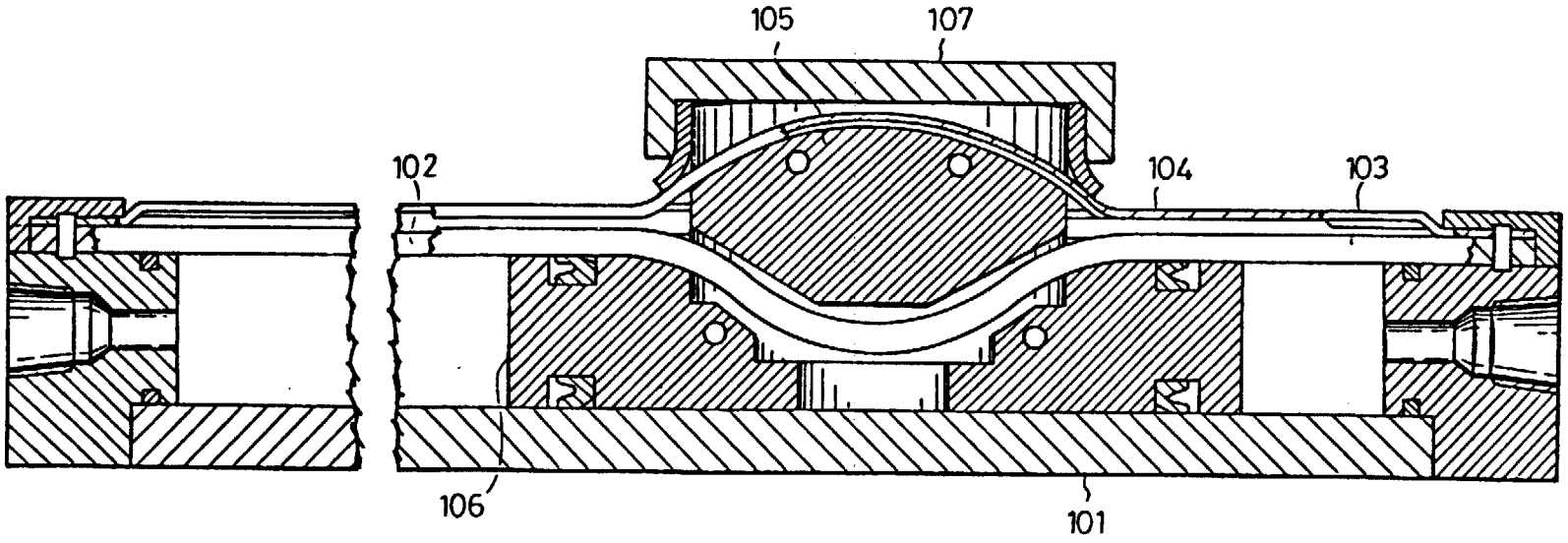
FIG. 7 is a vertical cross-sectional view of a rod-less cylinder according to the related art.

When the rod-less cylinder according to this embodiment is operated, that is, when the bottom surface of the sealing member 53 is subjected to air pressure, the sealing member 53 is, as shown in FIG. 6, moved toward the inner surfaces 54 in the side recess 52 making the holding ribs 51 bend toward the relief grooves 61. Then, the top surfaces 56 of the sealing member 53 are brought into abutment against the inner edges 63 of the inner surfaces 54 of the side recess 52. As a result of this, a central portion of the sealing member 53 is slightly warped toward the slit 57 relative to the inner edges 63 each acting as a fulcrum, and the two end portions of the sealing member 53 are warped toward and pressed to the inner surface 54. That is, the whole body of the sealing member 53 is warped as shown by an alternate long and short dash line of FIG. 6. As a result of this, a continuous plane without any interceptions is formed at the joint between the inner surface 62 of the cylinder 55 and the bottom surface 60 of the sealing member 53, whereby the same effect as in the first embodiment is obtained.

As a modification of the second embodiment, the inner surface 54 of the side recess 52 may be formed in a flat plane disposed horizontally in the widthwise direction of the slit 57, and the top surface 56 of the sealing member 53, the top surface 56 opposing the inner surface 54 of the side recess 52, may be formed by a slanted surface that slants toward the inner surface 62 of the cylinder 55 as it extends from the inside to the outside.

As many apparently widely different embodiments of this invention may be made without departing from the spirit and scope thereof, it is to be understood that the invention is not limited to the specific embodiments thereof except as defined in the appended claims.

What is claimed is:

1. A rod-less cylinder comprising:

a cylinder having an inner surface, an outer surface, a slit disposed at said outer surface and extending in the longitudinal direction of said cylinder, said slit being defined by a pair of opposing side surfaces, and a side recess formed at said inner surface and having a width larger than that of said slit so as to extend beyond both said side surfaces of said slit in the widthwise direction thereof, said side recess extending along the length of said slit and having a pair of first surfaces intersecting said side surfaces of said slit and a pair of second surfaces intersecting said first surfaces;

a piston mounted in said cylinder [to be movable] *for movement* in a reciprocating manner; and a sealing member detachably fitted in said side recess for closing said slit, said sealing member having *a third surface facing said first surfaces, a pair of fourth surfaces each opposing one of the second surfaces,* a pair of holding ribs engageable with said second surfaces for holding said sealing member in said side recess, *each holding rib extending from an associated fourth surface at a position spaced from said third surface, relief grooves defined between said third surface and the respective holding ribs,* and a pair of sealing lips sealing the junctions between said inner surface of said cylinder and said side recess, [said sealing member including a supporting portion having a third surface facing said first surfaces, a pair of fourth surfaces opposing separate respective second surfaces, a separate plate-like holding rib on each of said fourth surfaces at a position spaced from said third surface, said holding ribs engaging said second surface, and a relief groove defined between said fourth surfaces and the respective holding ribs,] said third surface being positioned to engage said first surfaces to close said slit and to support said sealing member against said first surfaces when said sealing member is subjected to air pressure within said cylinder, said relief grooves permitting said holding ribs to move toward and away from said fourth surface.

2. A rod-less cylinder according to claim 1, wherein said first surfaces of said side recess are substantially perpendicular to said side surfaces of said slit, and said second surfaces are substantially perpendicular to said first surfaces.

3. A [rod-like] *rod-less* cylinder according to claim 2, wherein said second surfaces have tapered guide surfaces at the junctions with said inner surface of said cylinder, and said sealing lips are brought into close contact with said guide surfaces when said sealing member is held in said side [recesses] *recess.*

4. A rod-less cylinder according to claim 1, wherein said holding ribs are bendable [to] *such that they may be bent* when said sealing member is separated from or returned to said side recess.

5. A rod-less cylinder according to claim 1, *further comprising:*

*tapered guide surfaces extending between said second surfaces and the inner surface of the cylinder; and* wherein said inner surface of said cylinder has a slot-like cross sectional shape, and defines *substantially* flat surfaces at both sides of said guide surfaces, and said sealing member has a [fourth] *fifth* surface forming a flat plane with said flat surface when said sealing member is held in said side recess.

6. A rod-less cylinder according to claim 1, wherein said first surfaces of said side recess are slanted surfaces that slant toward the outside of said cylinder in the direction away from said side surfaces of said slit, and when said sealing member is held in said side recess and is not subjected to the air pressure in said cylinder, a gap remains between said third surface and said first [surface] *surfaces.*

* * * * *